US012617245B2

(12) United States Patent
Zhang et al.

(10) Patent No.: US 12,617,245 B2
(45) Date of Patent: May 5, 2026

(54) VEHICLE TIRE DETECTION DEVICE

(71) Applicant: Hamaton Automotive Technology Co., Ltd, Hangzhou (CN)

(72) Inventors: Jianer Zhang, Hangzhou (CN); Zenan Hu, Hangzhou (CN); Mingguang Yu, Hangzhou (CN)

(73) Assignee: Hamaton Automotive Technology Co., Ltd, Hangzhou (CN)

( * ) Notice: Subject to any disclaimer, the term of this patent is extended or adjusted under 35 U.S.C. 154(b) by 308 days.

(21) Appl. No.: 18/578,645

(22) PCT Filed: Jul. 31, 2023

(86) PCT No.: PCT/CN2023/110313
§ 371 (c)(1),
(2) Date: Jan. 11, 2024

(87) PCT Pub. No.: WO2024/074077
PCT Pub. Date: Apr. 11, 2024

(65) Prior Publication Data
US 2025/0091393 A1     Mar. 20, 2025

(30) Foreign Application Priority Data
Oct. 8, 2022    (CN) .......................... 202211228513.9

(51) Int. Cl.
*G01L 17/00*        (2006.01)
*B60C 23/04*        (2006.01)
(52) U.S. Cl.
CPC ........ *B60C 23/0438* (2013.01); *B60C 23/041* (2013.01); *B60C 23/0444* (2013.01); *G01L 17/00* (2013.01)

(58) Field of Classification Search
CPC .............. B60C 23/0438; B60C 23/041; B60C 23/0444; B60C 23/0496; B60C 23/0452;
(Continued)

(56) References Cited

U.S. PATENT DOCUMENTS

| 8,204,458 B2 | 6/2012 | Gauthier | |
| 11,095,265 B2 * | 8/2021 | Akiyama ................. | H03H 7/38 |

(Continued)

FOREIGN PATENT DOCUMENTS

| CN | 101332749 A | 12/2008 |
| CN | 101572352 A | 11/2009 |

(Continued)

OTHER PUBLICATIONS

European Patent Office, Extended European Search Report Issued in Application No. 23874269.6, Feb. 14, 2025, Germany, 8 pages.

(Continued)

*Primary Examiner* — Freddie Kirkland, III
(74) *Attorney, Agent, or Firm* — Christopher R. Carroll; Carroll, Hoette & Butscher, LLC

(57) ABSTRACT

The present application discloses a vehicle tire detection device, including a TPMS (Tire Pressure Monitoring System) sensor, an antenna matching network, and a terminal antenna. The TPMS sensor uses ASK/OOK/FSK transmission technology with a data transmission rate greater than 20 kbps. The TPMS sensor is connected to the terminal antenna through the antenna matching network. The terminal antenna is one of a valve stem, a metal base, or a tire rim.

9 Claims, 1 Drawing Sheet

(58) Field of Classification Search
CPC ...... G01L 17/00; H03H 7/0115; H03H 7/175; H03H 7/38
See application file for complete search history.

(56) References Cited

U.S. PATENT DOCUMENTS

| | | | | |
|---|---|---|---|---|
| 12,491,740 B2 * | 12/2025 | Zhang | ................ | B60C 23/0418 |
| 2025/0083480 A1 * | 3/2025 | Zhang | ................ | B60C 23/0418 |

FOREIGN PATENT DOCUMENTS

| | | |
|---|---|---|
| CN | 201670062 U | 12/2010 |
| CN | 102255606 A | 11/2011 |
| CN | 102729742 A | 10/2012 |
| CN | 204109700 U | 1/2015 |
| CN | 204309535 U | 5/2015 |
| CN | 105252972 A | 1/2016 |
| CN | 207607310 U | 7/2018 |
| CN | 219214628 U | 6/2023 |

OTHER PUBLICATIONS

Melexis: "MLX91801 Tire Pressure Monitoring SiP Datasheet", Sep. 30, 2011, XP093239070, 21 pages.
Infineon: "Tire Pressure Monitoring Sensor SP40PLUS Data Sheet", May 14, 2020, XP093239026, 72 pages.
Nxp Semiconductors: "NTM88 family of tire pressure monitor sensors", Apr. 24, 2020, XP093239040, 205 pages.
ISA State Intellectual Property Office of the People's Republic of China, International Search Report Issued in Application No. PCT/CN2023/110313, Nov. 4, 2023, WIPO, 5 pages.
ISA State Intellectual Property Office of the People's Republic of China, Written Opinion of the International Searching Authority Issued in Application No. PCT/CN2023/110313, Nov. 4, 2023, WIPO, 7 pages.(Submitted with Machine/Partial Translation).

* cited by examiner

VEHICLE TIRE DETECTION DEVICE

CROSS-REFERENCE TO RELATED APPLICATIONS

This application is a national stage of international PCT Application No. PCT/CN2023/110313 filed on Jul. 31, 2023, and claims a priority to a Chinese Patent Application with the corresponding application number being 202211228513.9 and the application date being Oct. 8, 2022, the entire contents of which are incorporated herein by reference.

TECHNICAL FIELD

The present application relates to the field of tire detection, and in particular to a vehicle tire detection device.

BACKGROUND

As countries are gradually implementing TPMS (Tire Pressure Monitoring System) standards, the demand for products is on the rise. The mainstream technology for TPMS sensors currently used by vehicle manufacturers is based on ASK (Amplitude Shift Keying) or FSK (Frequency Shift Keying) modulation methods, and the battery specifications typically involve 2032, 2050, or 2450 lithium-manganese batteries, with a capacity of 200 mAh or more to meet the product lifespan requirements. This is because the emission cycle and emission current occupied by traditional FSK or ASK modulation determine the emission power consumption, which prevents the selection of smaller batteries in traditional technology and necessitates the use of larger batteries to obtain a larger battery capacity to meet lifespan requirements of the product.

Based on tests and research of similar TPMS sensors in the market, regardless of whether the technology is ASK or FSK modulation, the current TPMS radio frequency data transmission rate is within 20 kbps, where the transmission rate with the highest market share being 9.6 kbps or 10 kbps. Calculated at a rate of 9.6 kbps, assuming that a frame of data is 10 bytes, a data preamble is added, a total length of emitting a frame of data is approximately 8.5 ms, with an FSK emission power of 8 dbm, the conversion current is about 8-10 mA, which means that the continuous current consumption during the 8.5 ms time of emitting the frame of data is approximately 8~10 mA. Therefore, reducing the emission current consumption by shortening the time to emit a frame of data, and thereby reducing the power consumption during emission, is a good direction for technical breakthrough.

Due to the main vehicle-mounted electronic radio frequency in the market being 433.92 MHz, in environments with concentrated vehicles such as parking lots, there are multiple 433.92 MHz carrier radio frequency signals intermittently existed in spaces, i.e., the existence of same-frequency interference. This is not beneficial for the anti-interference capability of related technologies (long emission cycles). For example, during the emission of a frame of signal, if a carrier signal with the same frequency is emitted from another vehicle, the same-frequency collision can cause data disorder, CRC (Cyclic Redundancy Check) verification errors at the receiving end, leading to failed data emission. Thus, reducing the transmission cycle also helps to improve penetration of signals.

SUMMARY

The purpose of the present application is to provide a vehicle tire detection device that balances data emission efficiency and receiving sensitivity.

The disclosure is achieved through the following technical measures: a vehicle tire detection device that includes a TPMS (Tire Pressure Monitoring System) sensor using ASK/OOK/FSK (Amplitude Shift Keying/On-Off Keying/Frequency Shift Keying) transmission technology with a data transmission rate greater than 20 kbps.

Considering that the data transmission rate of related TPMS sensors is within 20 kbps, with long radio frequency frame emission cycles and high emission power consumption; by adopting a TPMS sensor with a data transmission rate greater than 20 kbps in the present application, the aim is to reduce the radio frequency emission time of the detection device, reduce the emission power consumption, enhance the signal transmission penetration, and improve radio frequency anti-interference capability.

In some embodiments, the device further includes an antenna matching network and a terminal antenna, where the TPMS sensor is connected with the terminal antenna through the antenna matching network; the terminal antenna is one of a valve stem, a metal base or a tire rim.

Since the TPMS sensor used in this structure has increased the data transmission rate, and the bandwidth occupied by the data increases, which may result in a certain decrease in sensitivity at the receiving end. In this structure, using a valve stem or tire rim as the terminal antenna enhances a length and area of the antenna, resulting in better signal conversion efficiency compared to the built-in antenna of the sensor, and better transmission stability of the sensor on the vehicle; furthermore, the terminal antenna is on the outside of the tire body, which is beneficial for increasing the strength of the wireless signal. With the same emission power of the TPMS sensor, it is easier to achieve wireless communication over a longer distance, increasing the data transmission rate and reducing the error rate.

In this structure, the antenna matching module includes an inductor L1, an inductor L2, an inductor L3, and a capacitor C1 and a capacitor C2; a first end of the inductor L1 is connected with a tire pressure system integrated chip of the TPMS sensor, a second end of the inductor L1 is connected with a first end of the capacitor C2, a second end of the inductor L2, and a first end of the capacitor C1; a first end of inductor L3 is connected with a second end of the capacitor C1 and the terminal antenna; a second end of the capacitor C2 is grounded, and a first end of the inductor L2 is connected with a positive electrode of power supply; the inductor L1 and the capacitor C2 form a first-order low-pass filter, and the capacitor C1 and the inductor L3 form a high-pass filter network.

In this structure, the built-in antenna originally in the TPMS sensor is removed, and the valve stem or tire rim is used as the terminal antenna, which brings about the issue of antenna matching. This structure improves the transmission performance of the antenna through two layers of filtering networks to achieve the purpose of antenna matching.

In some embodiments, the battery of the TPMS sensor uses a button cell with a diameter of 16 mm and a thickness of 3.2 mm.

After the rate of TPMS radio frequency data transmission is increased, the power consumption decreases, and the original large battery is no longer suitable. In this structure, the volume and weight of the TPMS sensor are reduced by reducing the battery size.

In some embodiments, the battery is paralleled with a supercapacitor C3.

Due to the reduction in battery capacity, in the modulation method based on ASK/OOK/FSK, the emission current will reduce the voltage in the supply end during the instant of data emission, a voltage drop is formed, especially in extreme low-temperature environments, the internal activity of battery decreases and the output voltage internal resistance increases. At this time, if a radio frequency signal is emitted, the emission transient current will cause a voltage drop of 0.2~0.8V in the battery. To solve this problem, the capacitor C3 is paralleled on a side of the battery, and the capacitor C3 is used for energy storage to compensate for the voltage drop caused by the sudden change in battery emission current.

In some embodiments, the TPMS sensor is externally mounted, and located at the valve stem.

In some embodiments, the TPMS is directly connected with the terminal antenna, or connected with the terminal antenna through an extension rod.

Since the TPMS sensor uses a new terminal antenna, if an internal installation method is adopted, metal wires and metal fabric used for reinforcement in the tire structure will have a certain shielding effect on the wireless signal, which will inevitably affect the transmission and reception of the signal. Therefore, in this structure, the TPMS sensor is externally mounted and located at the valve stem, with a closer distance from the terminal antenna, overcoming the signal shielding defects brought by internal installation.

In some embodiments, when the TPMS sensor uses the NTM88 chip series, the data transmission rate is greater than or equal to 38.4 kbps.

BRIEF DESCRIPTION OF DRAWINGS

The drawings serve to provide a further understanding of the present application and form part of the description, used in conjunction with the embodiments of the present application to explain the application, and do not constitute a limitation of the application. In the drawings.

DETAILED DESCRIPTION

Figure 1:
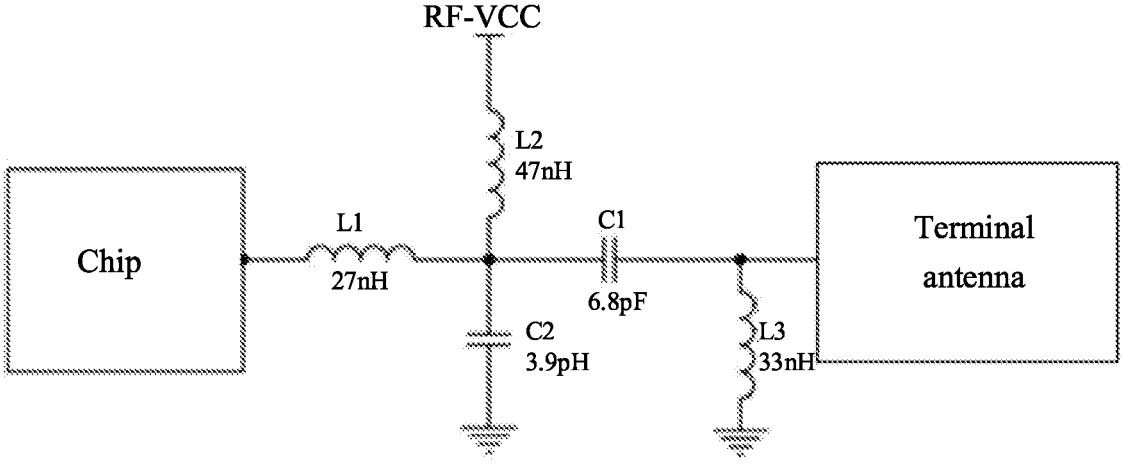
FIG. 1 is a structural diagram of the vehicle tire detection device.

The following will provide a more detailed description of the exemplary embodiments of the present application with reference to the accompanying drawings. Although the drawings show an exemplary embodiment of the present application, it should be understood that the application can be implemented in various forms and should not be limited by the embodiments described here. Instead, these embodiments are provided to enable a more thorough understanding of the application and to fully convey the scope of the application to those skilled in the art.

A vehicle tire detection device includes a TPMS (Tire Pressure Monitoring System) sensor, an antenna matching network, and a terminal antenna, where the TPMS sensor is connected with the terminal antenna through the antenna matching network. The TPMS sensor uses ASK/OOK/FSK transmission technology, with a data transmission rate greater than 20 kbps, and further, when the TPMS sensor uses the NTM88 chip series, the data transmission rate can be increased to 38.4 kbps. Traditional ASK/OOK/FSK tire pressure sensors have a data transmission rate less than 20 kbps. If the data transmission rate is to be increased, the sensitivity at the receiving end is to be sacrificed, where the sensitivity at the receiving end is a critical indicator in the detection process. Therefore, for a long time, the data transmission rate could not be increased. In the present application, the TPMS sensor increases the data transmission rate to 20 kbps or higher. The configuration method involves clock frequency division configuration through internal registers, with the clock frequency coming from an external crystal oscillator or an internal RC oscillator. Specifically, the baud rate Baudrate=Fxtal/[52*(BPS [7:0]+1)], where BPS [7:0] bit is input to the external crystal oscillator to generate a clock signal, and the clock signal is passed through an internal frequency divider to generate the baud rate. When the external crystal clock is 26 MHz, the baud rate can increase from 1953 bps/s to 500000 bps/s per second, applying the baud rate formula gives 26/[52*(12+1)]=0.0384, which means the data transmission rate is 38.4 kbps.

To address the sensitivity issue, in the present application, the TPMS sensor no longer uses a PCBA (Printed Circuit Board Assembly) built-in antenna, but instead uses one of a valve stem, metal base or tire rim as the terminal antenna, with antenna matching through the antenna matching network. Using one of a valve stem, metal base or tire rim as the terminal antenna enhances a length and area of the antenna, resulting in better radio frequency radiation power and signal conversion efficiency compared to the built-in antenna of the sensor, and better transmission stability of the sensor on the vehicle. Furthermore, the terminal antenna is at the outside of the tire body, which is beneficial for increasing the strength of the wireless signal. With the same emission power of the TPMS sensor, it is easier to achieve wireless communication over a longer distance, increasing the data transmission rate and reducing the error rate. According to experimental verification, under the premise of meeting the sensitivity requirements, when the TPMS sensor of the present application uses the NTM88 chip series, the data transmission rate can be increased to 38.4 kbps. Assuming a frame of data with a total length of 10 bytes, the theoretical total consumption time for emitting a frame of data is about 2.1 ms, the emission consumption current cycle is four times less than the current cycle of 9.6 kbps used by mainstream TPMS sensors in the current market, it is only a quarter of the emission consumption current cycle of the mainstream TPMS sensors, thus achieving the effect of reducing emission power consumption. At the same time, with the rate increased to 38.4 kbps or higher, the carrier time for transmitting the same data frame is reduced. If the space same-frequency interference signal is intermittent, the probability of the carrier quickly passing through the interference gap is more than four times higher than that of 9.6 kbps, thus achieving the effect of high radio frequency anti-interference.

The antenna matching network uses a dual-stage filtering network, as shown in FIG. 1, the antenna matching network includes a first-order low-pass filter composed of an inductor L1 and a capacitor C2, and a high-pass filter network composed of a capacitor C1 and an inductor L3. A first end of the inductor L1 is connected with the TPMS sensor (chip), and a first end of the inductor L1 is connected with a first end of the capacitor C2, a second end of the inductor L2, and a first end of the capacitor C1; a first end of the inductor L3 is connected with a second end of the capacitor C1 and the terminal antenna; a second end of the capacitor C2 is grounded, and a first end of the inductor L2 is connected with a positive electrode of a power supply. An inductance value range of the inductor L3 varies depending on a design of a loop and an impedance of the terminal antenna, generally ranging from 8.2 nH to 68 nH. The inductor L3 not only serves the impedance matching function here, but also, due to its small inductance value, can reduce instantaneous current and provide ESD (Electrostatic Discharge) protection.

The original TPMS sensor, in order to balance the needs for transmission rate and sensitivity, generally uses a traditional 2032 battery, and the minimum diameter of the sensor needs to be above 24 mm. After the rate of TPMS radio frequency data transmission is increased, the power consumption decreases, and the original large battery is no longer suitable. Therefore, in the present application, the TPMS sensor uses a button cell battery, such as CR1632 or BR1632 batteries, with a diameter of 16 mm and a thickness of 3.2 mm. The diameter is reduced, and the battery weight is decreased, when taking a similar internal potting process as an example, a weight of the button cell battery used in the TPMS sensor only about 50% of the 2032 battery. Compared to TPMS sensors of similar products in the industry, the TPMS sensor in the present application is smaller in size, which can reach around 20 mm, and lighter in weight. As a high-speed running product installed on tires, its unique advantages greatly enhance the physical safety of driving.

Figure 2:
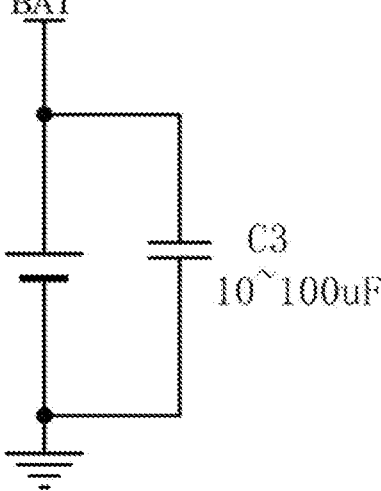
FIG. 2 is a power supply structure diagram.

Furthermore, due to the reduction in battery size and capacity, in the modulation method based on ASK/OOK/FSK, the emission current will reduce the voltage in the supply end during the instant of data emission, a voltage drop is formed, especially in extreme low-temperature environments, the internal activity of battery decreases and the output voltage internal resistance increases. At this time, if the TPMS sensor emits a radio frequency signal, the emission transient current will cause a voltage drop of 0.2~0.8V in the battery. In view of this, as shown in FIG. 2, in the present application, a supercapacitor C3 is paralleled on the battery, and the capacitor C3 is used for energy storage to compensate for the voltage drop caused by the sudden change in battery emission current. The capacity of capacitor C3 ranges from 10 uF to 100 uF and can be a surface-mounted multi-layer ceramic capacitor (MLCC) or a surface-mounted tantalum capacitor. At the moment of signal emission, the battery voltage drops, and at this time, the capacitor C3 begins to discharge to ensure the battery output voltage being relatively balanced and avoid system sudden reset. After the emission is completed, the battery slowly charges capacitor C3, and this cycle continues.

Furthermore, the TPMS sensor is externally mounted, generally set at the valve stem for easy installation, directly connected with the terminal antenna, or connected with the terminal antenna through an extension rod. Taking the connection method with the valve stem being the terminal antenna as an example: the TPMS sensor is connected with the original vehicle valve stem by a threaded connection, and an internal sealing pad of the TPMS sensor contacts a mouth flat surface of the valve stem, requiring a certain assembly torque to ensure that the TPMS sensor and the valve stem are sealed after assembly and do not loosen during use. In the past, there were designs that placed the TPMS sensor on the outside of the tire, but considering the limitations of installation technology and professional rigor of personnel in the aftermarket, many car beauty shops or repair shops did not perform dynamic balance calibration when installing or replacing TPMS sensors, when larger volume and weight TPMS sensors were on one side of the tire, a great risk and hazards were brought for driving at high speed. In the present application, since the battery size and capacity have been greatly reduced and the built-in antenna has been removed, the overall volume and weight of the TPMS sensor have also been reduced, so the miniaturized design reduces the safety hazards brought by high-speed operation of traditional TPMS sensors.

After actual testing, when the TPMS sensor is installed on outside of the vehicle tire, the actual transmission distance measured by the receiver is that: when the reception rate is around 90%, the effective distance can reach more than 25 meters, fully meeting the needs of practical use scenarios. Since the emission current of the new TPMS sensor is only ¼ of the product with a traditional rate, after theoretically calculated, the TPMS sensor can work for about 7 years, meeting the demand for product lifespan of the customer.

Obviously, those skilled in the art can make various modifications and variations to the present application without departing from the spirit and scope of the present application. Thus, if these modifications and variations of the present application fall within the scope of the claims and their equivalent technologies of the present application, the present application also intends to include these modifications and variations.

The invention claimed is:

1. A vehicle tire detection device, comprising a TPMS (Tire Pressure Monitoring System) sensor with a data transmission rate greater than 20 kbps; an antenna matching network and a terminal antenna, wherein the TPMS sensor is connected with the terminal antenna through the antenna matching network;

wherein the terminal antenna is one of a valve stem, a metal base or a tire rim; wherein the antenna matching network comprises an inductor L1, an inductor L2, an inductor L3, and a capacitor C1 and a capacitor C2; a first end of the inductor L1 is connected with a tire pressure system integrated chip of the TPMS sensor, a second end of the inductor L1 is connected with a first end of the capacitor C2, a second end of the inductor L2, and a first end of the capacitor C1; a first end of the inductor L3 is connected with a second end of the capacitor C1 and the terminal antenna; a second end of the capacitor C2 is grounded, and a first end of the inductor L2 is connected with a positive electrode of a power supply; and the inductor L1 and the capacitor C2 are configured to form a first-order low-pass filter, and the capacitor C1 and inductor L3 are configured to form a high-pass filter network.

2. The vehicle tire detection device according to claim 1, wherein a battery of the TPMS sensor uses a button cell with a diameter of 16 mm and a thickness of 3.2 mm.

3. The vehicle tire detection device according to claim 2, wherein the battery is paralleled with a supercapacitor C3.

4. The vehicle tire detection device according to claim 1, wherein the TPMS sensor is externally mounted and located at the valve stem.

5. The vehicle tire detection device according to claim 4, wherein the TPMS is directly connected with the terminal antenna.

6. The vehicle tire detection device according to claim 1, wherein when the TPMS sensor uses NTM88 chip series, the data transmission rate of the TPMS sensor is greater than or equal to 38.4 kbps.

7. The vehicle tire detection device according to claim 4, wherein the TPMS is connected with the terminal antenna through an extension rod.

8. The vehicle tire detection device according to claim 1, wherein an inductance value range of the inductor L3 ranges from 8.2 nH to 68 nH.

9. The vehicle tire detection device according to claim 3, wherein a capacity of the supercapacitor C3 ranges from 10 uF to 100 uF.

* * * * *